United States Statutory Invention Registration [19]

[11] Reg. Number: H462

Zibilich, Jr.

[43] Published: Apr. 5, 1988

[54] MARINE CABLE GEOPHONE ASSEMBLY

[75] Inventor: Anthony M. Zibilich, Jr., Mandeville, La.

[73] Assignee: Shell Oil Company, Houston, Tex.

[21] Appl. No.: 495,852

[22] Filed: May 18, 1983

[51] Int. Cl.[4] ..... G01V 1/38

[52] U.S. Cl. ..... 367/19; 367/31; 367/75; 181/110

[58] Field of Search ..... 367/15–17, 367/19, 31, 75, 20, 177, 188; 181/110, 118, 120, 112, 401

[56] References Cited

U.S. PATENT DOCUMENTS

| | | | |
|---|---|---|---|
| 2,354,548 | 7/1944 | Ricker | 367/75 |
| 2,551,417 | 5/1951 | Carlisle | 367/177 |
| 2,592,780 | 4/1982 | Woods | 367/154 |
| 2,729,300 | 1/1956 | Paslay et al. | 181/110 |
| 3,660,809 | 5/1972 | Pearson | 367/165 |
| 3,921,755 | 11/1975 | Thigpen | 181/112 |
| 3,939,464 | 2/1976 | Swenson | 367/154 |
| 3,954,154 | 5/1976 | Kruppenbach et al. | 181/112 |
| 4,109,757 | 8/1978 | Hebberd | 181/112 |
| 4,160,229 | 7/1979 | McGough | 367/169 |
| 4,446,538 | 5/1984 | Zachariadis | 367/19 |

*Primary Examiner*—Stephen C. Buczinski
*Assistant Examiner*—Linda J. Wallace

[57] ABSTRACT

A geophone assembly for use in a marine seismic cable to detect converted shear waves reflected from the strata in response to a compressional wave generated in the body of water associated with the strata. The geophone assembly comprises a cylindrical mount that has a central aperture and a geophone positioned in the central aperture. The mount has a plurality of additional apertures that are sized and positioned to accommodate the plurality of stress members in the cable, and the mount is sized and made of a material so that the weight of the mount is sufficient to cause at least the portion of the cable jacket that is adjacent the mount to contact the seafloor.

8 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MARINE CABLE GEOPHONE ASSEMBLY

BACKGROUND OF THE INVENTION

This invention relates generally to seismic exploration of substrata beneath bodies of water and, more particularly, to marine seismic exploration conducted by sensing converted shear waves reflected from such substrata in response to a downwardly travelling compressional wave.

Marine seismic exploration is generally conducted by towing a seismic streamer at a given depth through the ocean or other body of water. The streamer is provided with a plurality of pressure sensors, such as hydrophones, disposed at appropriate intervals along its length. Compressional wave energy is provided in the vicinity of the cable by an air gun or other suitable means; this compressional wave energy travels downwardly through the earth with a portion of it being reflected upwardly at levels where there is a contrast in the acoustic impedance characteristics of the strata. The pressure sensors detect the compressional waves produced in the water by the upwardly travelling seismic reflections and provide electrical signals indicative thereof to suitable processing and recording equipment located on the seismic vessel that is towing the streamer. It has been found that shear waves are generated from the compressional waves at interfaces in the strata; these shear waves contain additional information on the nature of the strata. However, this data is not considered since the reflected shear waves are not sensed by the marine seismic systems of the prior art.

Therefore, it is an object of the present invention to provide a geophone assembly suitable for use with a marine cable to detect the converted shear waves reflected from the strata during seismic exploration with a compressional source.

SUMMARY OF THE INVENTION

In accordance with the present invention there is provided a geophone assembly for use in a marine seismic cable to detect converted shear waves reflected from the strata in response to a compressional wave generated in the body of water associated with the strata. The cable has a jacket which encloses a plurality of stress members, a plurality of electric wires and a fluid. The geophone assembly comprises a cylindrical mount that has a central aperture and a geophone positioned in the central aperture. The mount has a plurality of additional apertures that are sized and positioned to accommodate the plurality of stress members in the cable, and the mount is sized and made of a material so that the weight of the mount is sufficient to cause at least the portion of the cable jacket that is adjacent the mount to contact the seafloor.

In a preferred embodiment, the mount comprises three similarly shaped segments which form a cylinder when assembled. Both ends of each segment have a groove which mates with the grooves in the adjacent segments to form the three apertures that are sized and positioned to accommodate the three stress members in the cable. The segments are connected together by screws and suitable threaded apertures so that the mount can be easily assembled and disassembled. Each segment of the mount can also have a groove in its outer surface so that approximately one-third of the electrical wires in the cable can be passed around each segment of the mount. The mount should be made of a relatively heavy material that resists deformation and corrosion, such as brass, to ensure that the geophone is properly coupled to the ocean bottom. Preferably, the geophone is placed in a protective casing or housing, such as PVC tubing, to protect it from corrosion and pressure damage, and the ends of the tubing are sealed with epoxy or the like. The tubing is positioned in the central aperture of the mount and is held there securely when the mount is assembled.

Other objectives, advantages and applications of the present invention will be made apparent by the following detailed description of the preferred embodiments of the present invention.

DETAILED DESCRIPTION OF THE PREFERRED EMBODIMENTS

Figure 1:
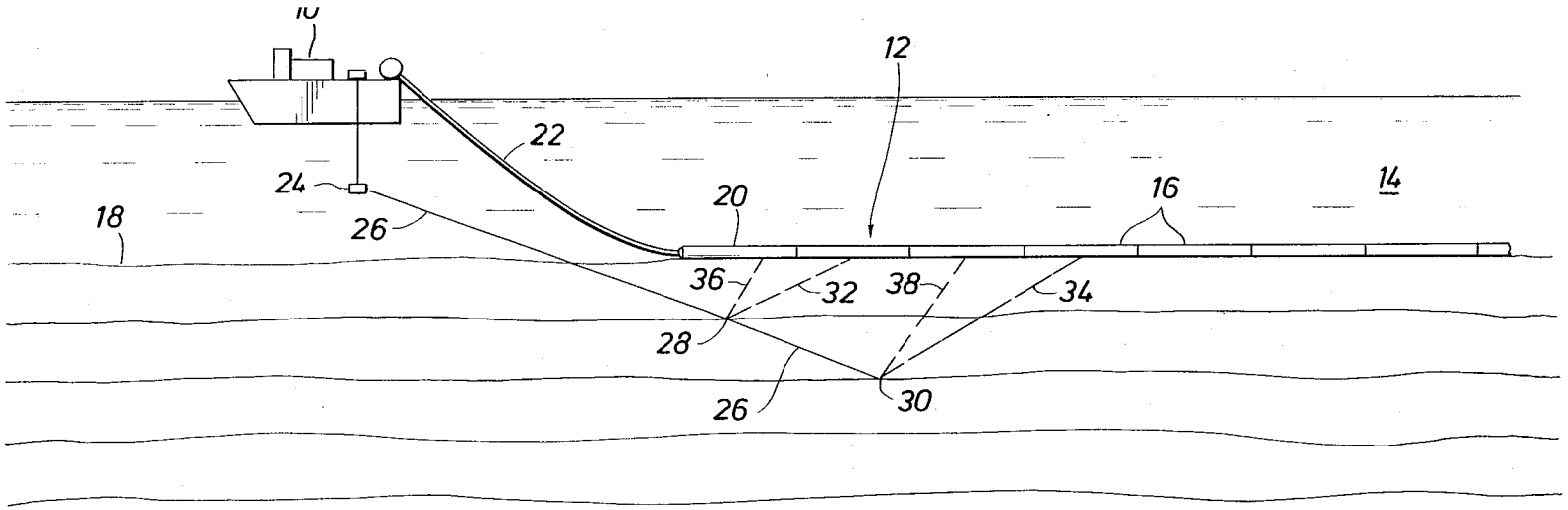
FIG. 1 is a diagrammatic view of a seismic survey utilizing a marine cable to detect converted shear waves reflected from the strata.

Referring to FIG. 1, a seismic exploration vessel 10 is shown deploying a marine cable 12 to seismically explore the substrata that is beneath body of water 14. Cable 12 can be quite lengthy, for example, a mile or more, and is normally composed of a number of individual active sections 16 connected end to end. Each section 16 contains a plurality of geophones (not shown) and is positioned adjacent bottom 18. Cable 12 can be positioned on bottom 18 in the desired location by dragging it to the desired location or by reeling it in and then unreeling it at the desired location as vessel 10 moves forward. Section 20 of cable 12 which is connected to the first section 16 is a weighted section containing, for example, lead or other suitable material. Lead-in section 22, which can be an armored cable, connects section 20 to vessel 10. Section 20 should contain sufficient weight so that the waves in body of water 14 acting on vessel 10 and lead-in section 22 do not tend to decouple sections 16 from bottom 18. If desired, the tail end of cable 12 can also be provided with a weighted section 20 and a suitable location buoy, as is known in the art. Compressional wave energy is provided in the vicinity of cable 12 by an air gun 24 or other suitable means; air gun 24 can be deployed from vessel 10 or a second vessel which can move in the vicinity of the geophones without moving cable 12. Compressional wave 26, which is generated by air gun 24 and is indicated by a straight line, travels downwardly through body of water 14 and the earth with a portion of it being reflected upwardly at points where there is a contrast in the acoustic impedance between layers of the strata, for example, points 28 and 30, where a portion of compressional wave 26 is reflected upwardly as indicated by reflected compressional waves 32 and 34. In addition, converted shear waves 36 and 38 are reflected at points 28 and 30 respectively. Reflected shear waves 36 and 38 travel upwardly through the strata and are detected by the geophones located in sections 16 of cable 12. The electric signals produced by the geophones in response to the reflected shear waves are transmitted along wires in cable 12 to suitable recording and/or processing equipment located on vessel 10. In addition, if desired, hydrophones or other compressional wave transducers can be positioned in active sections 16 to detect reflected compressional waves 32 and 34. It should be noted that cable 12 should be allowed to settle for a predetermined period of time, for example, 10–12 seconds has been found to be a suitable length of time after the cable has been towed into position at a speed of three knots, before air gun 24 is activated to ensure that cable 12 is properly coupled to bottom 18 and to ensure that the noise transients generated during the positioning of cable 12 have been attenuated.

Figure 2:
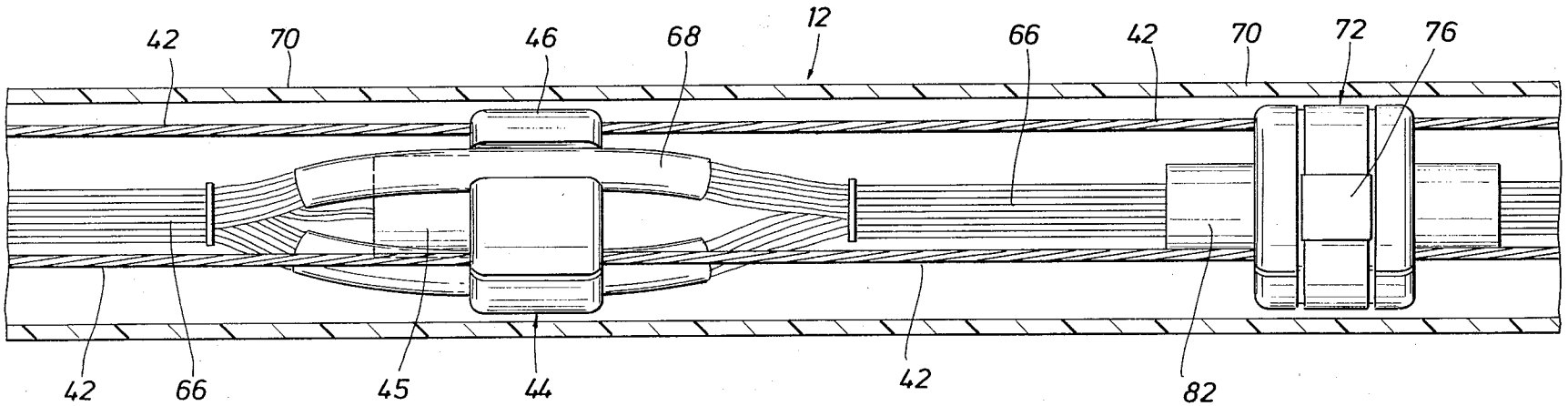
FIG. 2 is a sectional view in side elevation of a marine cable utilizing the geophone assembly of the present invention.
Figure 3:
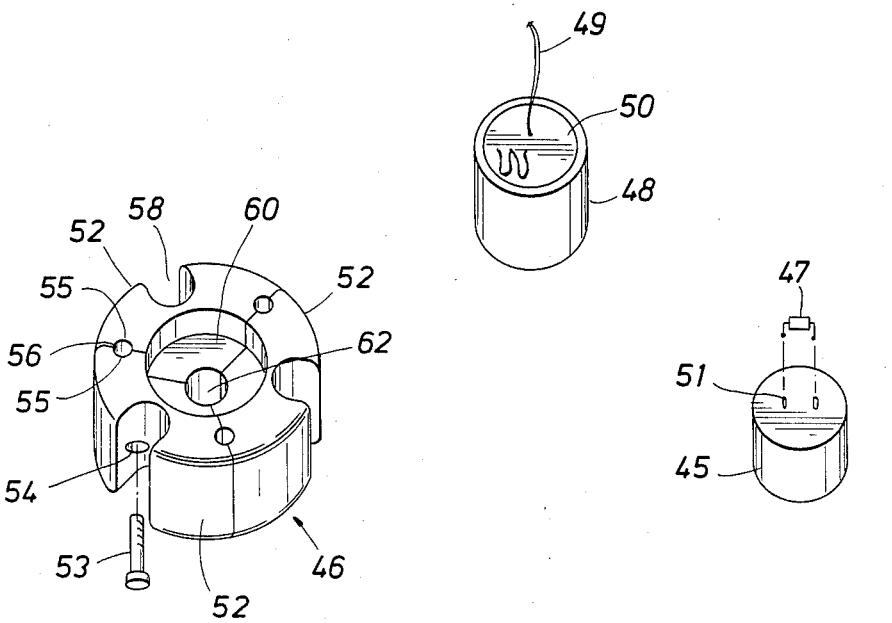
FIG. 3 is an exploded view of the geophone assembly incorporated in the marine cable shown in FIG. 2.

FIGS. 2 and 3 illustrate one embodiment of the geophone assembly of the present invention and its incorporation into cable 12 of FIG. 1. Each geophone assembly 44 includes a conventional geophone 45, which is used to detect horizontal motion, and a mount 46 adapted for securing geophone 45 at a predetermined location along cable 12. A damping resistor 47 connected across terminals 51 of geophone 45, and wires 49 are connected to terminals 51. Preferably, geophone 45 and damping resistors 47 are positioned in protective housing 48, such as PVC tubing, and the ends of housing 48 are sealed by epoxy 50 or the like to protect geophone 45 from corrosion and pressure damage. Mount 46 comprises three similarly shaped segments 52 which form a cylindrical housing or mount when assembled by screws 53 in apertures 54. Both ends of each segment 52 have a groove 55 which mates with grooves 55 in the adjacent segments 52 to form apertures 56 which are sized and positioned to accommodate the three stress members 42 which are maintained in the shape of an equilateral triangle by plastic spacers (not shown), as is known in the art. Central cavity 60 is sized such that housing 48 is held securely therein when screws 53 are tightened. Mount 46 can be provided with a further smaller cavity 62 adjacent to central cavity 60 for epoxy or the like to further ensure proper bonding between mount 46 and housing 48. Each of sections 52 has a groove 58 in its outer surface, and approximately one-third of the wires from group of wires 66 are wrapped in a protective covering 68, such as polyurethane, and positioned in each of grooves 58. Wires 49 from terminal 51 are connected to a pair of wires from group of wires 66 by conventional means. Mount 46 should be made of a relatively heavy material that resists deformation and corrosion, such as brass, to ensure that geophone 45 is properly coupled to the ocean bottom. Cable 12 is provided with a jacket 70 of, for example, polyurethane plastic, which provides a relatively smooth and damage resistant outer surface and is filled with a suitable liquid, such as kerosene.

Figure 4:
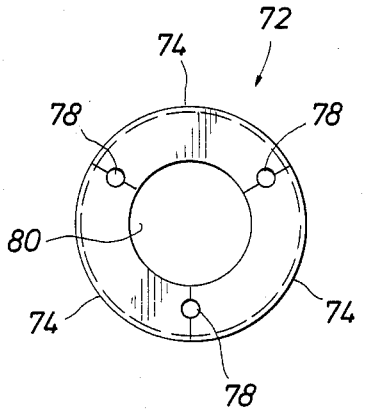
FIG. 4 is an elevational view of the weight assembly incorporated in the cable of FIG. 2.

Referring to FIGS. 2 and 4, preferably, cable 12 has weight assemblies 72 positioned equidistantly on each side of geophone assembly 44. Weight assembly 72 can be made of, for example, lead or other suitable material to ensure that cable 12 settles and is properly coupled to the ocean bottom. Weight assembly 72 consists of three sections 74 that are held together to form a cylinder by metal strap 76 or other suitable means. Each of sections 74 has a groove 75 in each end such that when sections 74 are held together by strap 76 grooves 75 form apertures 78 which are sized to accommodate stress members 42. Weight assembly 72 has a central aperture 80 which is sized to accommodate group of wires 66. A protective covering 82, such as polyurethane, can be inserted in central aperture 80 to prevent chafing or group of wires 66.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A geophone assembly for use in a marine seismic cable, comprising:

a cylindrical mount having a central opening therein and having a size and weight to be contained within said cable and cause at least a portion of said cable adjacent said mount to contact seafloor, and a geophone horizontally positioned in said central opening.

2. A geophone assembly as recited in claim 1, wherein said mount is assembled from a plurality of mating sections.

3. A geophone assembly as recited in claim 2, wherein said mating sections are detachably held together by a plurality of screws.

4. A geophone assembly as recited in claim 3, wherein said plurality of mating sections comprises three of said mating sections.

5. A geophone assembly as recited in claim 1, wherein said geophone is contained in a sealed housing.

6. A geophone assembly as recited in claim 5, wherein said housing is a tube sealed with epoxy at each end.

7. A geophone assembly as recited in claim 1, wherein said marine seismic cable contains a plurality of stress members and electric wires, and wherein said mount has a plurality of apertures to respectively contain said stress members and a plurality of exterior grooves to accommodate a portion of said electric wires.

8. A geophone assembly as recited in claim 7, wherein said mount is removably attached to said stress members.

* * * * *